United States Patent
Wang

(10) Patent No.: US 11,442,502 B2
(45) Date of Patent: Sep. 13, 2022

(54) DISPLAY DEVICE

(71) Applicants: K-TRONICS (SUZHOU) TECHNOLOGY CO., LTD., Jiangsu (CN); BOE TECHNOLOGY GROUP CO., LTD., Beijing (CN)

(72) Inventor: Changnao Wang, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/185,146

(22) Filed: Feb. 25, 2021

(65) Prior Publication Data
US 2021/0263555 A1 Aug. 26, 2021

(30) Foreign Application Priority Data
Feb. 25, 2020 (CN) .......................... 202010116359.0

(51) Int. Cl.
*G06F 1/16* (2006.01)

(52) U.S. Cl.
CPC ................................. *G06F 1/1605* (2013.01)

(58) Field of Classification Search
CPC .... G06F 1/1605; G06F 1/1601; G06F 1/1607; G06F 1/1632; H04R 1/026; H04R 1/028; H05K 5/0204; H04N 5/64; F16M 11/22
USPC ...................................................... 361/679.01
See application file for complete search history.

(56) References Cited

U.S. PATENT DOCUMENTS

| | | | | |
|---|---|---|---|---|
| 5,193,069 A | * | 3/1993 | Furuya | G06F 1/1679 361/679.29 |
| 6,268,997 B1 | * | 7/2001 | Hong | G06F 1/1601 361/679.07 |
| 2002/0000505 A1 | * | 1/2002 | Cho | F16M 11/2014 248/371 |
| 2004/0047115 A1 | * | 3/2004 | Helot | F16M 11/2021 361/679.06 |
| 2005/0213290 A1 | * | 9/2005 | Lauffer | G06F 1/1605 361/679.21 |
| 2011/0069055 A1 | * | 3/2011 | Jung | H04N 5/64 345/211 |

(Continued)

FOREIGN PATENT DOCUMENTS

| | | |
|---|---|---|
| CN | 208093057 U * | 11/2018 |
| CN | 208093057 U | 11/2018 |

(Continued)

OTHER PUBLICATIONS

First Office Action for Chinese Application No. 202010116359.0, dated Dec. 24, 2020, 9 Pages.

*Primary Examiner* — Adrian S Wilson
*Assistant Examiner* — Gage Crum
(74) *Attorney, Agent, or Firm* — Brooks Kushman P.C.

(57) ABSTRACT

The present disclosure provides a display device, including: a loudspeaker box including a first end surface provided with a first opening and a connection line extending outward through the first opening; a display assembly mounted on the first end surface, and including a second end surface and a connection terminal, the connection line being connected to the connection terminal; and a connection cover plate configured to shield the first opening, and connected to the loudspeaker box and the display assembly.

17 Claims, 6 Drawing Sheets

(56) References Cited

U.S. PATENT DOCUMENTS

| | | | |
|---|---|---|---|
| 2011/0073738 A1* | 3/2011 | Takao | F16M 11/22 |
| | | | 248/397 |
| 2012/0268449 A1* | 10/2012 | Choi | H05K 5/0234 |
| | | | 345/214 |
| 2013/0163163 A1* | 6/2013 | Lee | F16M 11/2092 |
| | | | 361/679.01 |
| 2017/0374754 A1* | 12/2017 | Kim | H05K 5/0234 |

FOREIGN PATENT DOCUMENTS

| CN | 209046854 U | 6/2019 |
|---|---|---|
| CN | 209606883 U | 11/2019 |

\* cited by examiner

DISPLAY DEVICE

CROSS-REFERENCE TO RELATED APPLICATION

This application claims priority to Chinese patent application No. 202010116359.0 filed on Feb. 25, 2020, which is incorporated herein by reference in its entirety.

TECHNICAL FIELD

The present disclosure relates to the field of display technology, in particular to a display device.

BACKGROUND

Display technique is a technique of providing flexibly-changed visual information through an electronic technique. Along with the development of the display technique, currently a display all-in-one machine has been widely used due to such advantages as beautiful structure and being convenient to carry.

SUMMARY

The present disclosure provides in some embodiments a display device, including: a loudspeaker box including a first end surface provided with a first opening and a connection line extending outward through the first opening; a display assembly mounted on the first end surface, and including a second end surface and a connection terminal, the connection line being connected to the connection terminal; and a connection cover plate configured to shield the first opening, and connected to the loudspeaker box and the display assembly.

In a possible embodiment of the present disclosure, the second end surface is provided with a second opening and the connection terminal is exposed through the second opening, the connection cover plate is further configured to shield the first opening and the second opening.

In a possible embodiment of the present disclosure, the first end surface is an upper end surface of the loudspeaker box, and the loudspeaker box is reused as a base for the display assembly.

In a possible embodiment of the present disclosure, the second opening is arranged at an edge of the display assembly close to the loudspeaker box.

In a possible embodiment of the present disclosure, a barrier structure is further arranged on the first end surface and configured to define an enclosed space with a part of the connection cover plate, and the first opening is arranged in the enclosed space.

In a possible embodiment of the present disclosure, a protrusion is further provided on the first end surface and located within the enclosed space, and the display assembly includes a housing member extending toward the first end surface and fitted to the protrusion.

In a possible embodiment of the present disclosure, the protrusion is provided with a groove, and the housing member is inserted into the groove.

In a possible embodiment of the present disclosure, at least two protrusions are arranged on the first end surface and spaced apart from each other, and the display assembly includes at least two housing members extending toward the first end surface and spaced apart from each other.

In a possible embodiment of the present disclosure, the display assembly is fixedly connected to the loudspeaker box through a bolt passing through the housing member and the protrusion.

In a possible embodiment of the present disclosure, the connection cover plate includes a first plate body and a second plate body on different planes, the first plate body and the barrier structure define the enclosed space, and the second plate body is attached to the second end surface.

In a possible embodiment of the present disclosure, a first buckle is arranged at an edge of the first plate body away from the second plate body, a first slot adapted to the first buckle is formed in the barrier structure, a second buckle is arranged at an edge of the second plate body away from the first plate body, a second slot adapted to the second buckle is formed in the second end surface, and the connection cover plate is connected to the loudspeaker box and the display assembly through inserting the first buckle into the first slot and inserting the second buckle into the second slot.

In a possible embodiment of the present disclosure, the second plate body is further provided with a columnar protrusion protruding toward the second end surface, a first installation hole is formed in the columnar protrusion, a second installation hole is formed in the second end surface, the second plate body is attached to the second end surface, the first installation hole and the second installation hole are coaxial, and the second plate body is fixed onto the second end surface through a bolt passing through the first installation hole and the second installation hole.

In a possible embodiment of the present disclosure, a protruding harness fastener is arranged on a surface of the second plate body away from the second end surface.

In a possible embodiment of the present disclosure, a reinforcement rib is arranged on a surface of the second plate body facing the second end surface.

In a possible embodiment of the present disclosure, the display assembly includes a mainboard, at least a part of the mainboard is exposed through the second opening, and the connection terminal is arranged at the part of the mainboard exposed through the second opening.

In a possible embodiment of the present disclosure, a line clip for clipping the connection line is further arranged at the second opening.

In a possible embodiment of the present disclosure, the line clip is arranged at a position in the second opening close to the loudspeaker box, and includes a first part, a second part and a third part opposite to the second part, a surface of the first part facing the display assembly is attached to an end surface exposed through the second opening, and the second part and the third part are connected to the first part to form an opening structure of line clip for clipping the connection line.

In a possible embodiment of the present disclosure, a width of the connection cover plate in a first direction is smaller than a width of the loudspeaker box in the first direction, and the width of the loudspeaker box in the first direction is smaller than a width of the display assembly.

In a possible embodiment of the present disclosure, a groove is provided between the second opening and the second end surface, when the connection cover plate is connected to the display assembly, the connection cover plate is located in the groove, and an outer surface of the connection cover plate and the second end surface are in a same plane.

DETAILED DESCRIPTION

In order to make the technical problems to be solved, the technical solutions and the advantages of the present disclosure more apparent, the present disclosure will be described hereinafter in a clear and complete manner in conjunction with the drawings and embodiments.

Due to the integration of various functions, a conventional display all-in-one machine has such problems as complex lines and a complicated assembling process. For example, for a display device integrated with a loudspeaker box, when the loudspeaker box is connected to a display assembly, there are two groups of connection lines between the loudspeaker box and a mainboard of the display assembly, i.e., a group of connection lines between a loudspeaker and the mainboard, and a group of connection lines between a keyboard plate of the loudspeaker box and a flat cable for a socket of the mainboard. When two groups of lines extend from the mainboard and the loudspeaker box respectively and an adaptor is used, the connection lines may be complex, and the cost of materials and assembling may increase.

In order to solve the problems in the related art where the lines are complex and the assembling process is complicated when the display assembly is connected to the loudspeaker box, the present disclosure provides in some embodiments a display device. To be specific, a first opening is formed in a first end surface of a loudspeaker box, and a connection line extends through the first opening. A second opening is formed in a second end surface of a display assembly to expose a connection terminal connected to the connection line. The connection line of the loudspeaker box extends to the second opening and is connected to the connection terminal, so as to simplify a line structure when the loudspeaker box is connected to the display assembly, and facilitate the assembling. In addition, the first opening and the second opening are covered by a connection cover plate, so as to enable the display assembly to be connected to the loudspeaker box in a seamless manner, thereby to improve an appearance of the entire display device.

Figure 1:
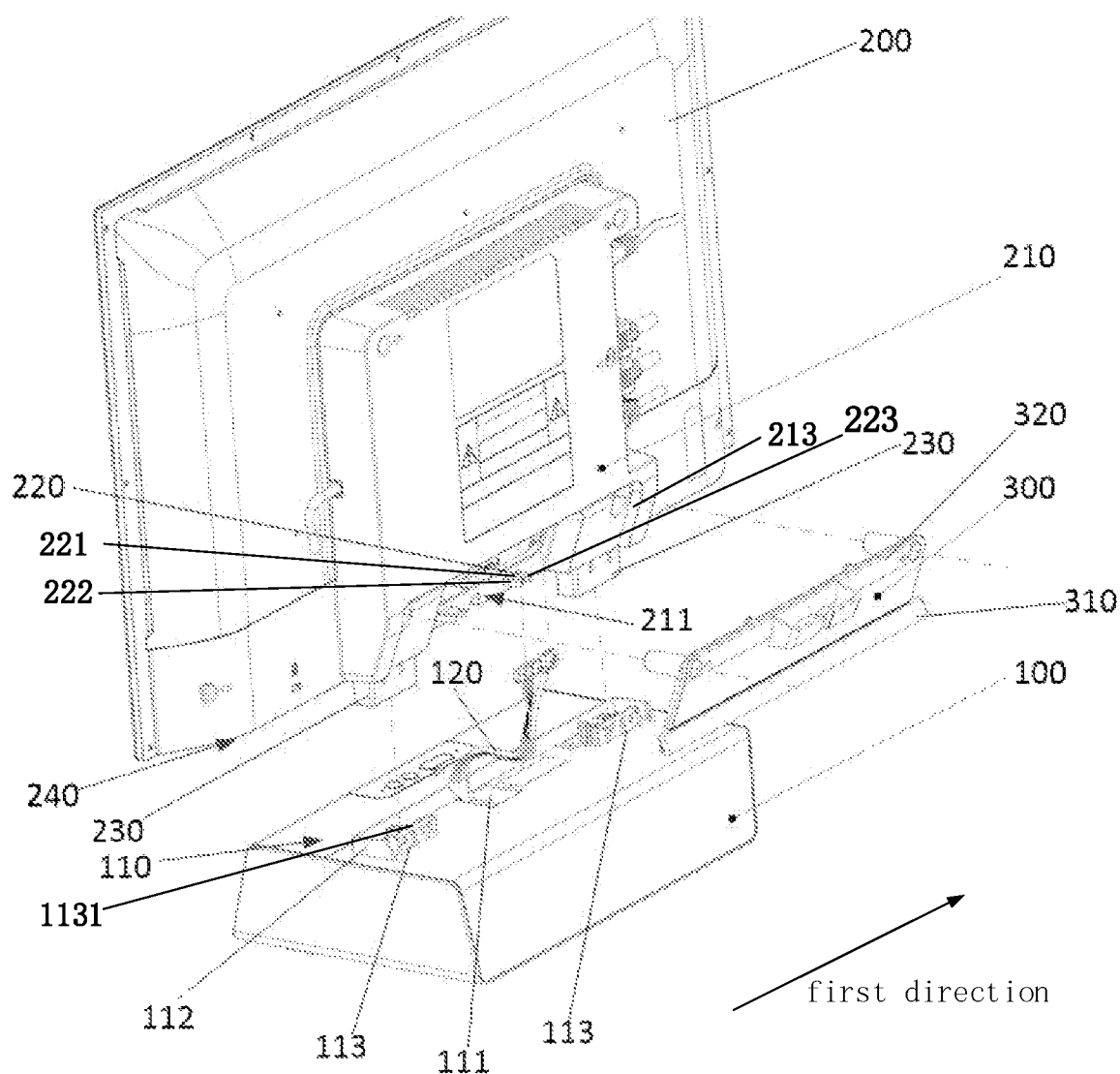
FIG. 1 is an exploded view of a display device according to one embodiment of the present disclosure.
Figure 2:
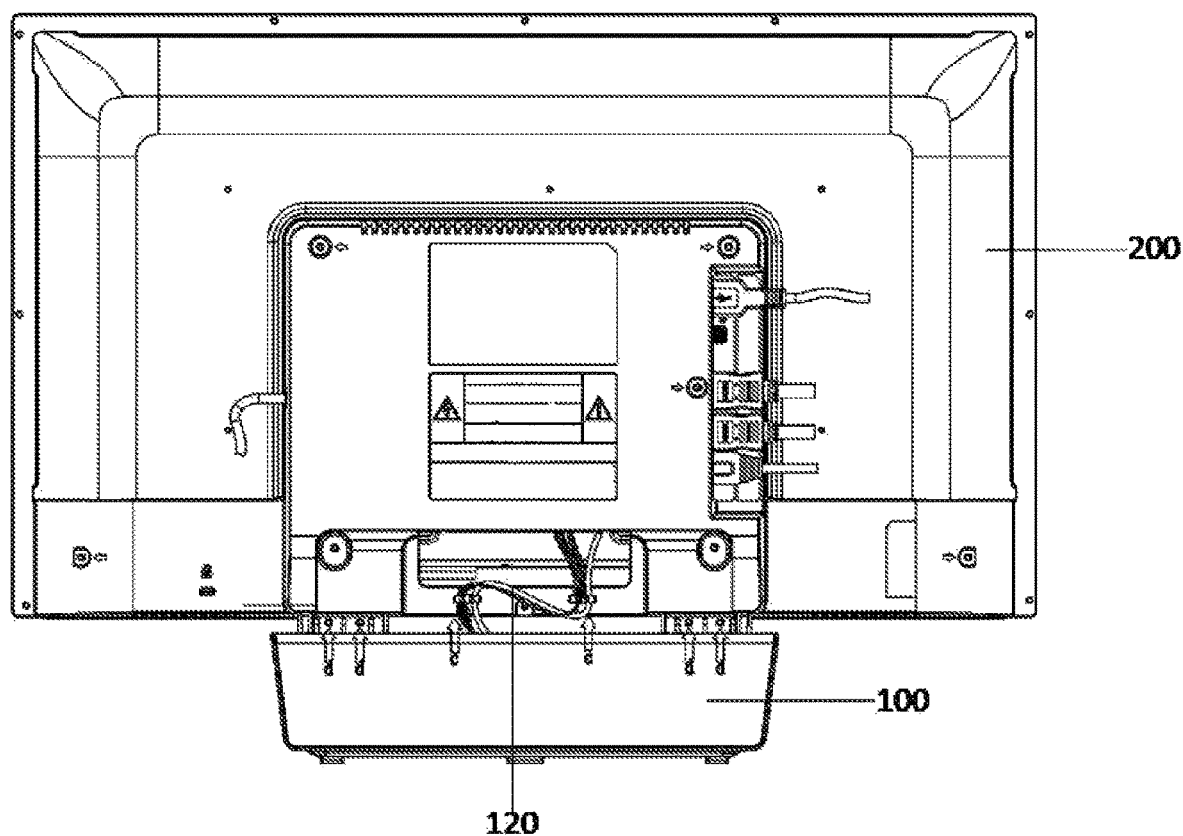
FIG. 2 is a schematic view showing the display device not equipped with a connection cover plate according to one embodiment of the present disclosure.
Figure 3:
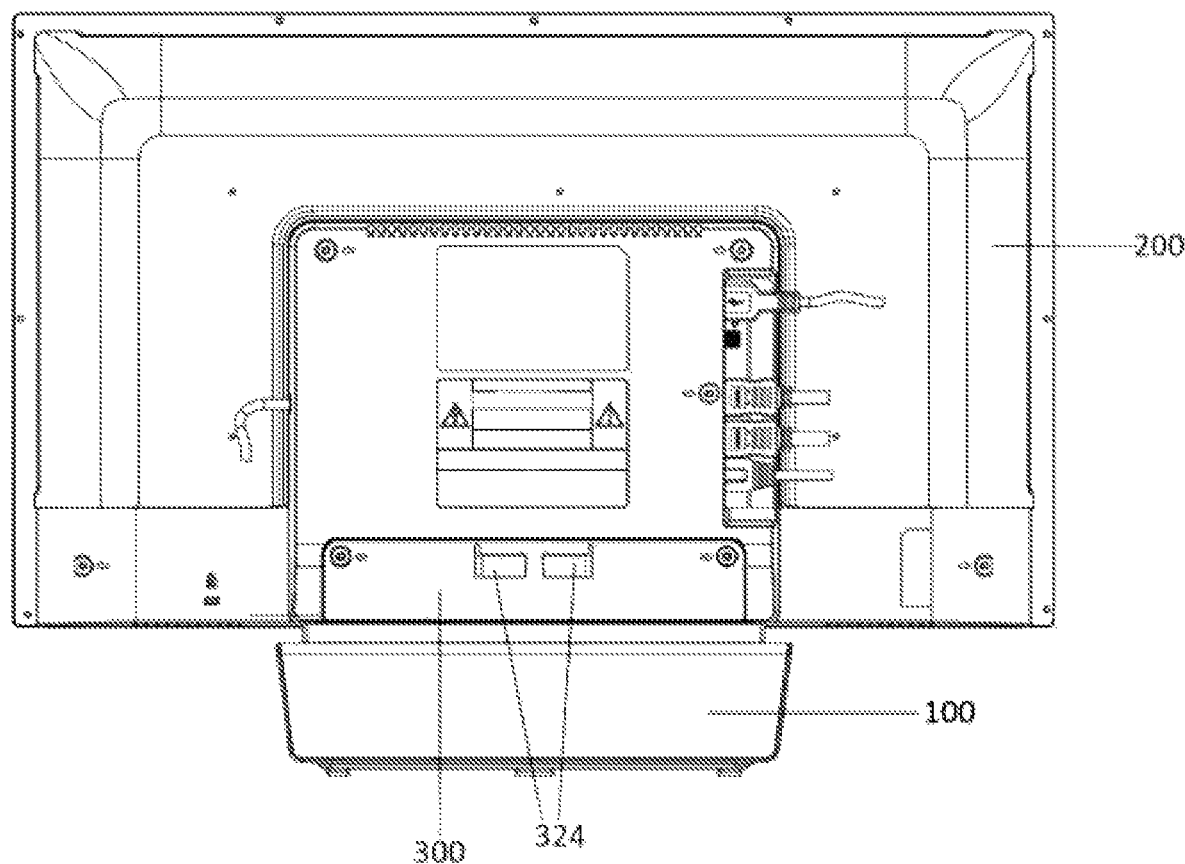
FIG. 3 is a rear view of the display device according to one embodiment of the present disclosure.

To be specific, as shown in FIGS. 1 to 3, the display device includes: a loudspeaker box 100 including a first end surface 110 provided with a first opening 111 and a connection line 120 extending outward through the first opening 111; a display assembly 200 mounted on the first end surface 110, and including a second end surface 210 and a connection terminal, the connection line 120 being connected to the connection terminal; and a connection cover plate 300 configured to shield the first opening 111, and connected to the loudspeaker box 100 and the display assembly 200.

In some embodiments of the present disclosure, the second end surface 210 is provided with a second opening 211 and the connection terminal is exposed through the second opening 211, the connection cover plate 300 is further configured to shield the first opening and the second opening.

In some embodiments of the present disclosure, the display assembly 200 may be fixedly or detachably connected to the loudspeaker box 100.

In some embodiments of the present disclosure, the connection line 120 may be connected to the connection terminal through insertion.

In some embodiments of the present disclosure, the connection cover plate 300 may be fixedly or detachably connected to the loudspeaker box 100 and the display assembly 200.

In the embodiments of the present disclosure, the connection line 120 between the loudspeaker box 100 and the display assembly 200 may extend from the loudspeaker box 100 to the display assembly 200 and be connected to the connection terminal of the display assembly 200. As compared with the related art where lines extend from the loudspeaker box 100 and the display assembly 200 respectively, it is unnecessary to provide any adaptor, thereby to simplify the line structure and facilitate the assembling.

In addition, the display assembly 200 may be arranged on the first end surface 110 of the loudspeaker box 100, and connected to the loudspeaker box 100 in a seamless manner through the connection cover plate 300. The connection line 120 between the loudspeaker box 100 and the display assembly 200 may be shielded by the connection cover plate 300, so as to further improve the appearance of the entire display device while simplifying the line structure between the loudspeaker box 100 and the display assembly 200 and facilitating the assembling.

In a possible embodiment of the present disclosure, the loudspeaker box 100 may include a housing and a loudspeaker assembly within the housing. A loudspeaker, buttons, an intelligent voice interaction module, an infrared remote control module and a Light-Emitting Diode (LED) indicator may be arranged on the housing.

The display assembly 200 may include a housing, a display panel installed on the housing, and a backlight source and a mainboard installed in the housing.

In a possible embodiment of the present disclosure, as shown in FIG. 1, the first end surface 110 of the loudspeaker box 100 provided with the first opening 111 may be an upper end surface of the loudspeaker box 100, the display assembly 200 may be arranged on the upper end surface of the loudspeaker box 100, and the loudspeaker box 100 may be reused as a base for the display assembly 200.

When the loudspeaker box 100 is reused as the base for the display assembly 200, it is able to provide the integrated display device.

In a possible embodiment of the present disclosure, the second end surface 210 of the display assembly 200 provided with the second opening 211 may be a surface of the housing of the display assembly 200 away from a display surface.

In a possible embodiment of the present disclosure, the second opening 211 may be arranged at an edge of the display assembly 200 close to the loudspeaker box 100.

As shown in FIG. 1, in a possible embodiment of the present disclosure, a barrier structure 112 may be arranged on the first end surface 110 and configured to define an enclosed space with a part of the connection cover plate 300, and the first opening 111 may be arranged in the enclosed space.

To be specific, an upper end surface of the housing may be formed as the first end surface 110, and the barrier structure 112 may be arranged on the upper end surface. A part of the connection cover plate 300 may cooperate with the barrier structure to define the enclosed space, within which the first opening 111, as well as the connection line 120 extending outward through the first opening 111, are arranged, so as to shield the connection line 120.

In a possible embodiment of the present disclosure, as shown in FIG. 1, a protrusion 113 may be further arranged on the first end surface 110 and located within the enclosed space. The display assembly 200 may include a housing member 230 extending toward the first end surface 110 and fitted to the protrusion 113.

In a possible embodiment of the present disclosure, the display assembly 200 may be fixedly connected to the loudspeaker box 100 through a bolt d (as shown in FIG. 2) passing through the housing member 230 and the protrusion 113.

To be specific, as shown in FIG. 1, the display assembly 200 may include a third end surface 240 adjacent to the second end surface 210, and the housing member 230 may be arranged on the third end surface 240 and extend toward the first end surface 110 to form a structure protruding from the third end surface 240.

Based on the above structure, when the display assembly 200 is installed on the loudspeaker box 100, the second end surface 210 may be angled relative to the first end surface 110 at a certain angle. In a possible embodiment of the present disclosure, the second end surface 210 may be perpendicular to the first end surface 110. In addition, the third end surface 240 may be attached to the first end surface 110, and the housing member 23 may be fitted to the protrusion 113.

In a possible embodiment of the present disclosure, on the first end surface 110, the protrusion 113 may be provided with a first groove 1131, and the housing member 230 may be inserted into the first groove 1131.

As shown in FIG. 1, in a possible embodiment of the present disclosure, two housing members 230 are arranged on the third end surface 240 of the display assembly 200 and spaced apart from each other. Of course, the quantity of the housing members 230 may not be limited to two, so as to ensure the stable connection between the display assembly 200 and the loudspeaker box 100.

Identically, at least two protrusions 113 may be arranged on the first end surface 110 and spaced apart from each other, so as to be fitted to at least two housing members 230 respectively.

Based on the above structure, as shown in FIG. 2, after the display assembly 200 has been arranged on the upper end surface of the loudspeaker box 100 and before the connection cover plate 300 has been installed, the display assembly 200 may be arranged on the loudspeaker box 100 with the loudspeaker box 100 as a base, and the third end surface 240 (a lower end surface) of the display assembly 200 may be attached to the upper end surface of the loudspeaker box 100. Further, the display assembly 200 may be stably arranged on the loudspeaker box 100 through a bolt passing through each housing member 230 of the display assembly 200 and the corresponding protrusion 113 of the loudspeaker box 100. In addition, the connection line 120 extending outward through the first opening 111 of the loudspeaker box 100 may extend to the second end surface 210 of the display assembly 200, and may be connected to the connection terminal exposed through the second opening 211 through insertion, so as to enable the connection line 120 to be electrically connected to a line of the display assembly 200.

Figure 4:
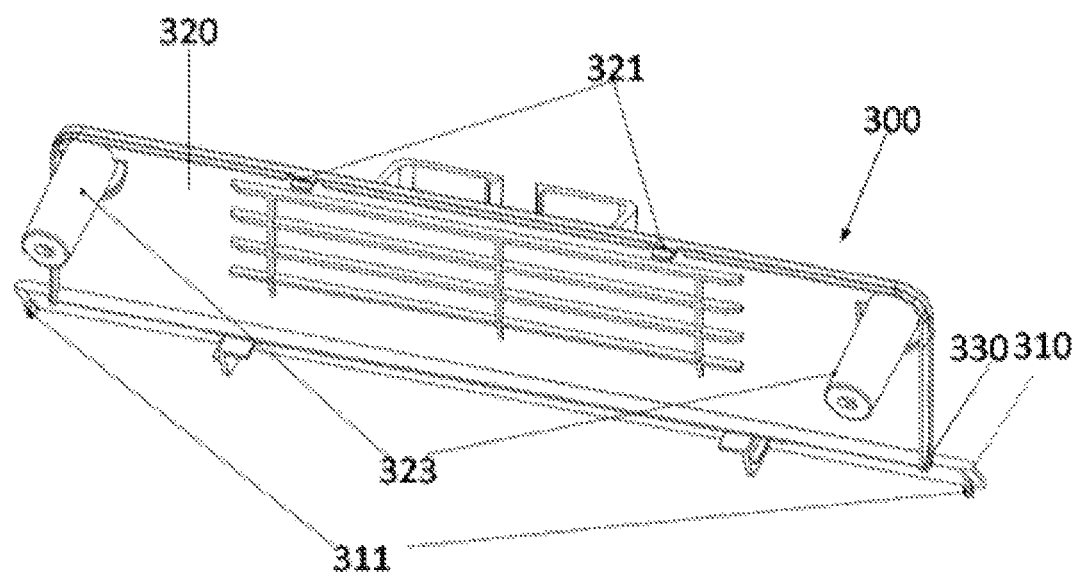
FIG. 4 is a solid view of the connection cover plate in the display device according to one embodiment of the present disclosure.
Figure 5:
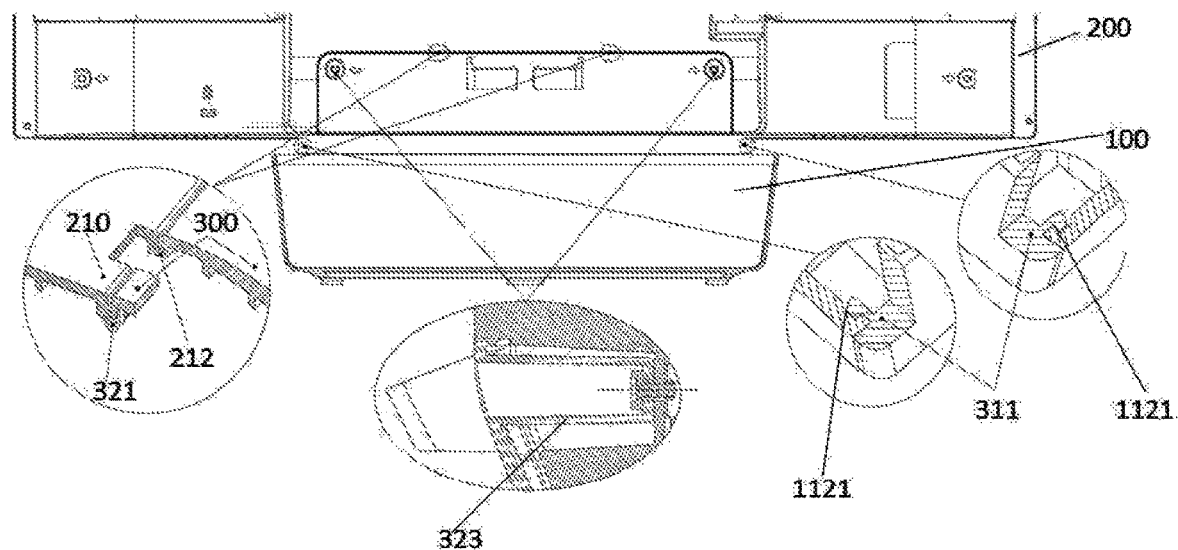
FIG. 5 is a partially enlarged view of the display device according to one embodiment of the present disclosure.

In the embodiments of the present disclosure, as shown in FIGS. 4 and 5 in conjunction with FIG. 3, the connection cover plate 300 may include a first plate body 310 and a second plate body 320 on different planes. The first plate body 310 and the barrier structure 112 may be combined to define the enclosed space, and the second plate body 320 may be attached to the second end surface 210.

In some embodiments of the present disclosure, a width of the connection cover plate 300 in a first direction is smaller than a width of the loudspeaker box 100 in the first direction, and the width of the loudspeaker box 100 in the first direction is smaller than a width of the display assembly 200.

In the embodiments of the present disclosure, the width of the connection cover plate 300 in a first direction may be a width of the first plate body 310, or a width of the second plate body 320.

In the embodiments of the present disclosure, the first direction may be parallel to an extending direction of a connection position 330 where the first plate body 310 and the second plate body 320 is connected to each other as a boundary.

In the embodiments of the present disclosure, the barrier structure 112 may be of a three-sided structure, and the first plate body 310 may be combined with the barrier structure 112 to define the four-sided enclosed space.

As shown in FIG. 5, a first buckle 311 may be arranged at an edge of the first plate body 310 away from the second plate body 320, and a first slot 1121 adapted to the first buckle 311 may be formed in the barrier structure 112. A second buckle 321 may be arranged at an edge of the second plate body 320 away from the first plate body 310, and a second slot 212 adapted to the second buckle 321 may be formed in the second end surface 210. The connection cover plate 300 may be connected to the loudspeaker box 100 and the display assembly 200 through inserting the first buckle 311 into the first slot 1121 and inserting the second buckle 321 into the second slot 212.

In some embodiments of the present disclosure, the first slot may be arranged at the edge of the first plate body 310 away from the second plate body 320, and the first buckle adapted to the first slot may be arranged on the barrier structure 112. In other words, the first plate body 310 may be connected to the barrier structure 112 in a snap-fit manner, with the buckle being arranged on one of the first plate body 310 and the barrier structure 112, and with the slot being formed in the other.

In some embodiments of the present disclosure, the second slot may be arranged at the edge of the second plate body 320 away from the first plate body 310, and the second buckle adapted to the second slot may be arranged on the second end surface 210. In other words, the second plate body 320 may be connected to the second end surface 210 in a snap-fit manner, with the buckle being arranged on one of the second plate body 320 and the second end surface 210, and with the slot being formed in the other.

In addition, the second plate body 320 may be further provided with a columnar protrusion 323 protruding toward the second end surface 210, a first installation hole may be formed in the columnar protrusion 323, a second installation hole may be formed in the second end surface 210, the second plate body 320 may be attached to the second end surface 210, the first installation hole and the second installation hole may be coaxial, and the second plate body 320 may be fixed onto the second end surface 210 through a bolt passing through the first installation hole and the second installation hole.

Based on the connection cover plate 300 with the above-mentioned structure, the connection cover plate 300 may be connected to the loudspeaker box 100 and the display assembly 200 in a snap-fit manner through the first buckle 311 and the second buckle 321, and the second plate body 320 may be firmly installed on the display assembly 200 through a bolt passing through a threaded hole in the columnar protrusion 323 of the second plate body 320, so as to firmly install the connection cover plate 300. Through the above structure, it is able to install the connection cover plate 300 on the display assembly 200 and the loudspeaker box 100 in a simple and convenient manner.

Figure 6:
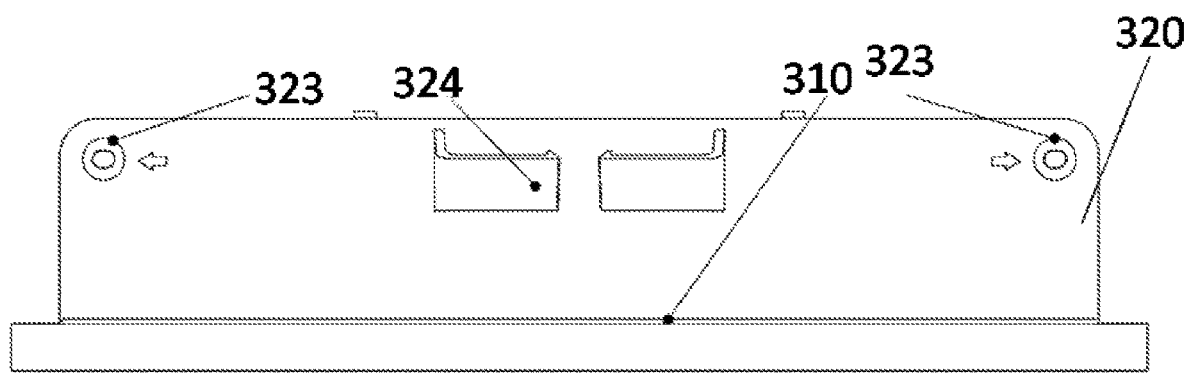
FIG. 6 is a planar view of the connection cover plate in the display device according to one embodiment of the present disclosure.

In addition, as shown in FIG. 6 in conjunction with FIG. 3, a protruding harness fastener 324 may be arranged on a surface of the second plate body 320 away from the second end surface 210.

Through the harness fastener 324, it is able to clip an external connection line of the display device, so as to further improve the appearance of the entire display device.

Further, as shown in FIGS. 4 and 5, a reinforcement rib may be arranged on a surface of the second plate body 320 facing the second end surface 210.

Through the reinforcement rib, it is able to increase strength of the second plate body 320.

In the embodiments of the present disclosure, the display assembly 200 may include a mainboard, at least a part of the mainboard may be exposed through the second opening 211, and the connection terminal connected to the connection line 120 may be arranged at the part of the mainboard exposed through the second opening 211.

In the embodiments of the present disclosure, apart for being entirely exposed through the second opening 211, the connection terminal arranged on the mainboard and connected to the connection line 120 may also be exposed partially through the second opening 211, as long as the connection line 120 may be connected to the connection terminal.

It should be appreciated that, the second end surface 210 may be a rear housing of the display assembly 200, and the rear housing may be provided with a connection port for an external device.

In a possible embodiment of the present disclosure, a line clip 220 for clipping the connection line 120 may be further arranged at the second opening 211 in the second end surface 210, as shown in FIG. 1. Through the line clip 220, it is able to place the connection line 120 tidily at the second opening 211.

In a possible embodiment of the present disclosure, the line clip 220 is arranged at a position in the second opening 211 close to the loudspeaker box 100, and includes a first part 221, a second part 222 and a third part 223 opposite to the second part 222, a surface of the first part 221 facing the display assembly 200 is attached to an end surface exposed through the second opening 211, and the second part 222 and the third part 223 are connected to the first part 221 to form an opening structure of line clip for clipping the connection line.

In a possible embodiment of the present disclosure, a second groove 213 is provided between the second opening 211 and the second end surface 210, when the connection cover plate 300 is connected to the display assembly 200, the connection cover plate 300 is located in the second groove 213, and an outer surface of the connection cover plate 300 and the second end surface 210 are in a same plane.

As shown in FIGS. 1 to 6, an assembling process of the display device will be described as follows.

The protrusion may be fitted to the housing member, so as to provide the display assembly 200 on the upper end surface of the loudspeaker box 100. Next, the connection line 120 may be connected to the connection terminal on the mainboard, and clipped by the line clip 220 on the second end surface 210. Next, the display assembly 200 may be installed on the loudspeaker box 100 through a bolt passing through the housing member 230 of the display assembly 200 and the protrusion 113 of the loudspeaker box 100. Then, the first buckle 311 and the second buckle 321 of the connection cover plate 300 may be aligned with, and inserted into, the first slot 1121 and the second slot 212 respectively, so as to install the connection cover plate 300 at a position where the display assembly 200 is connected to the loudspeaker box 100, and cover the connection line 120. Finally, the connection cover plate 300 may be fixed onto the display assembly 200 through a bolt passing through the installation hole in the columnar protrusion 323 on the surface of the second plate body 320 away from the display assembly 200.

Figure 7:
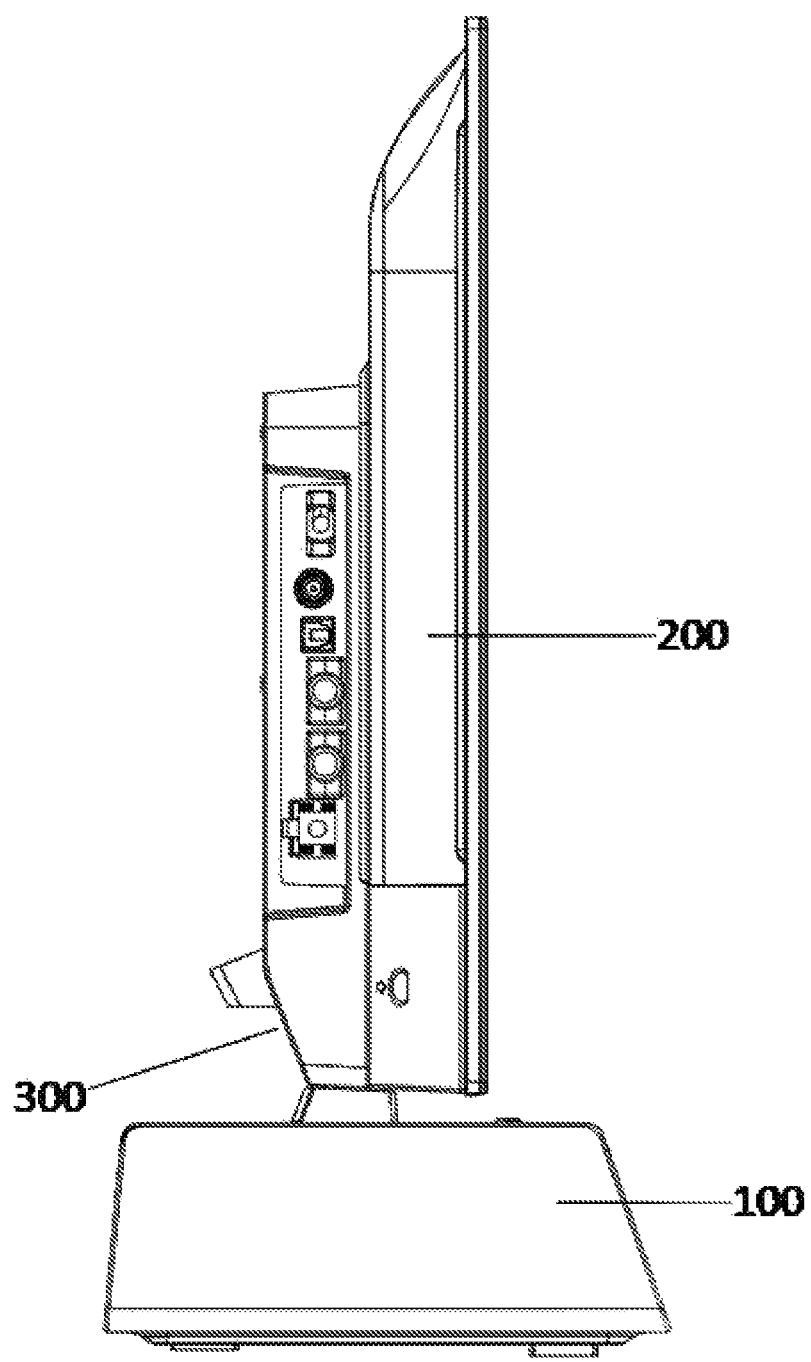
FIG. 7 is a side view of the display device according to one embodiment of the present disclosure.
Figure 8:
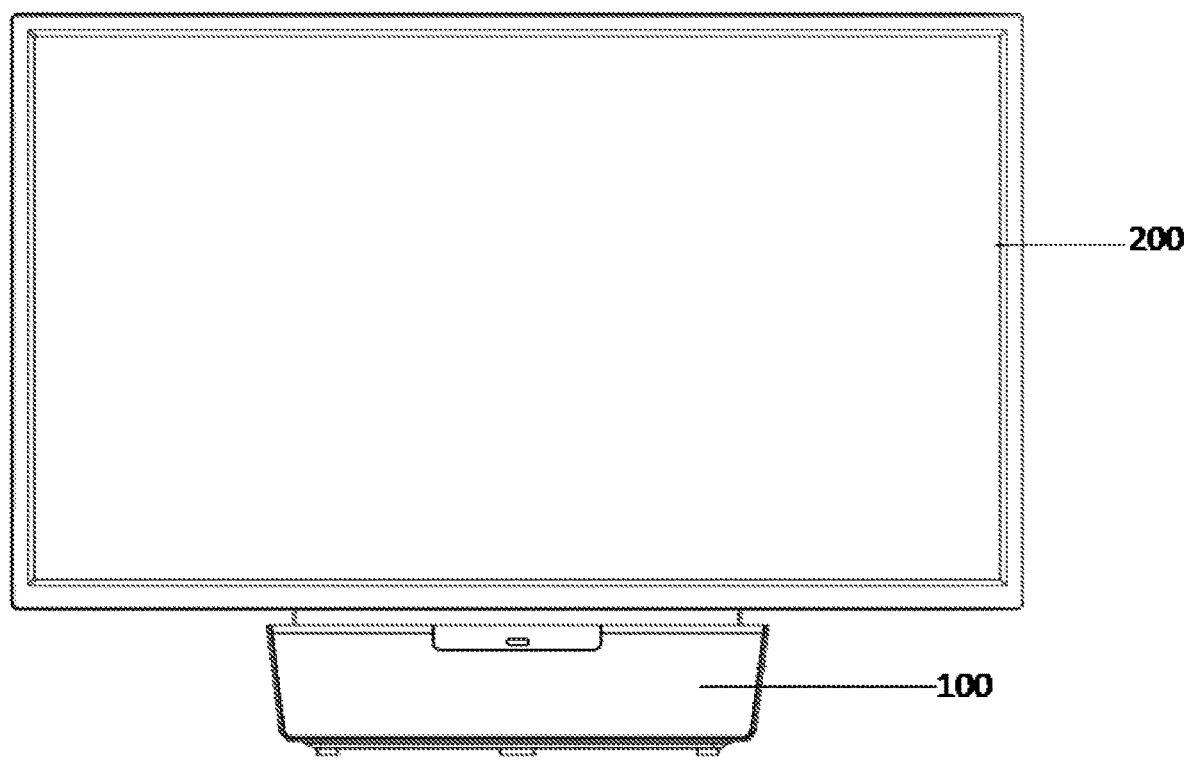
FIG. 8 is a front view of the display device according to one embodiment of the present disclosure.

According to the display device in the embodiments of the present disclosure, as shown in FIGS. 7 and 8, as compared with the related art, the loudspeaker box 100 may be reused as the base for the display assembly 200, so that the loudspeaker box 100 and the display assembly 200 may form an integral structure. The enclosed space may be formed between the display assembly 200 and the loudspeaker box 100, and the connection line 120 between the display assembly 200 and the loudspeaker box 100 may be arranged within the enclosed space and shielded by the connection cover plate 300. The display assembly 200 may be connected to the loudspeaker box 100 in a seamless manner through the connection cover plate 300, so as to improve the appearance of the entire display device.

To be specific, due to the connection cover plate 300 for shielding the connection line, the loudspeaker box 100 may be connected to the display assembly 200 in a seamless manner to form an integral structure. The connection cover plate 300 may be divided into two parts, i.e., an upper part and a lower part, with the connection position 330 where the first plate body 310 and the second plate body 320 is connected to each other as a boundary. A contour of the second plate body 320 in the upper part may be adapted to a contour of the rear housing of the display assembly, and the first plate body 310 in the lower part may cooperate with the barrier structure 112 on the upper end surface of the loudspeaker box 100, so as to provide a beautiful high-end display product with the loudspeaker box and the display assembly being formed integrally as viewed from the front, the side and the rear.

In addition, because the connection line 120 extends from the loudspeaker box 100 to the display assembly 200 and is connected to the connection terminal of the display assembly 200, as compared with the related art where lines extend from the loudspeaker box 100 and the display assembly 200 respectively, it is unnecessary to provide any adaptor, thereby to simplify the line structure and facilitate the assembling. In addition, it is able to reduce the cost of materials, improve the production efficiency and reduce the cost of assembling.

Further, when the display assembly and the loudspeaker box are formed integrally, it is able to provide the resultant display device with an excellent acoustic effect, and achieve the integration of intelligent human-machine voice interaction and high-definition display.

The above are merely optional embodiments of the present disclosure. Obviously, a person skilled in the art may make further modifications and improvements without departing from the principle of the present disclosure, and these modifications and improvements shall also fall within the scope of the present disclosure.

What is claimed is:

1. A display device, comprising:
    a loudspeaker box comprising a first end surface provided with a first opening and a connection line extending outward through the first opening;
    a display assembly mounted on the first end surface, and comprising a second end surface and a connection terminal, the connection line being connected to the connection terminal; and
    a connection cover plate configured to shield the first opening, and connected to the loudspeaker box and the display assembly;
    wherein a barrier structure is further arranged on the first end surface and configured to define an enclosed space with a part of the connection cover plate, the barrier structure is of a three-sided structure, and the part of the connection cover plate is combined with the barrier structure to define a four-sided enclosed space;
    wherein a protrusion is further provided on the first end surface, in direct contact with the first end surface, and located within the four-sided enclosed space, the display assembly comprises a housing member extending toward the first end surface, the display assembly further comprises a third end surface adjacent to the second end surface, the third end surface is attached to the first end surface when the display assembly is installed on the loudspeaker box, the housing member is in direct contact with the third end surface, the protrusion is provided with a first groove, the housing member is inserted into the first groove, and an orthogonal projection of the protrusion onto a same plane perpendicular to the first end surface falls within an orthogonal projection of the four-sided enclosed space onto the same plane.

2. The display device according to claim 1, wherein the second end surface is provided with a second opening and the connection terminal is exposed through the second opening, the connection cover plate is further configured to shield the first opening and the second opening.

3. The display device according to claim 1, wherein the first end surface is an upper end surface of the loudspeaker box, and the loudspeaker box is reused as a base for the display assembly.

4. The display device according to claim 2, wherein the second opening is arranged at an edge of the display assembly close to the loudspeaker box.

5. The display device according to claim 1, wherein the first opening is arranged in the enclosed space.

6. The display device according to claim 1, wherein at least two protrusions are arranged on the first end surface and spaced apart from each other, and the display assembly comprises at least two housing members extending toward the first end surface and spaced apart from each other.

7. The display device according to claim 1, wherein the display assembly is fixedly connected to the loudspeaker box through a bolt passing through the housing member and the protrusion.

8. The display device according to claim 1, wherein the connection cover plate comprises a first plate body and a second plate body on different planes, the first plate body and the barrier structure define the enclosed space, and the second plate body is attached to the second end surface.

9. The display device according to claim 8, wherein a first buckle is arranged at an edge of the first plate body away from the second plate body, a first slot adapted to the first buckle is formed in the barrier structure, a second buckle is arranged at an edge of the second plate body away from the first plate body, a second slot adapted to the second buckle is formed in the second end surface, and the connection cover plate is connected to the loudspeaker box and the display assembly through inserting the first buckle into the first slot and inserting the second buckle into the second slot.

10. The display device according to claim 9, wherein the second plate body is further provided with a columnar protrusion protruding toward the second end surface, a first installation hole is formed in the columnar protrusion, a second installation hole is formed in the second end surface, the second plate body is attached to the second end surface, the first installation hole and the second installation hole are coaxial, and the second plate body is fixed onto the second end surface through a bolt passing through the first installation hole and the second installation hole.

11. The display device according to claim 8, wherein a protruding harness fastener is arranged on a surface of the second plate body away from the second end surface.

12. The display device according to claim 8, wherein a reinforcement rib is arranged on a surface of the second plate body facing the second end surface.

13. The display device according to claim 2, wherein the display assembly comprises a mainboard, at least a part of the mainboard is exposed through the second opening, and the connection terminal is arranged at the part of the mainboard exposed through the second opening.

14. The display device according to claim 2, wherein a line clip for clipping the connection line is further arranged at the second opening.

15. The display device according to claim 14, wherein the line clip is arranged at a position in the second opening close to the loudspeaker box, and comprises a first part, a second part and a third part opposite to the second part, a surface of the first part facing the display assembly is attached to an end surface exposed through the second opening, and the second part and the third part are connected to the first part to form an opening structure of line clip for clipping the connection line.

16. The display device according to claim 1, wherein a width of the connection cover plate in a first direction is smaller than a width of the loudspeaker box in the first direction, and the width of the loudspeaker box in the first direction is smaller than a width of the display assembly.

17. The display device according to claim 2, wherein a second groove is provided between the second opening and the second end surface, when the connection cover plate is connected to the display assembly, the connection cover plate is located in the second groove, and an outer surface of the connection cover plate and the second end surface are in a same plane.

* * * * *